United States Patent [19]

Sperling et al.

[11] Patent Number: 4,910,693

[45] Date of Patent: Mar. 20, 1990

[54] METHOD AND APPARATUS FOR SAMPLING LATTICE PATTERN GENERATION AND PROCESSING

[75] Inventors: Irving Sperling, Costa Mesa; Oliver E. Drummond, Culver City; Irving S. Reed, Santa Monica, all of Calif.

[73] Assignee: Hughes Aircraft Company, Los Angeles, Calif.

[21] Appl. No.: 139,341

[22] Filed: Dec. 29, 1987

[51] Int. Cl.[4] ...................... G06F 15/62; G06F 15/66
[52] U.S. Cl. .................................. 364/572; 364/517; 382/27
[58] Field of Search .................... 382/27, 28; 364/516, 364/517, 525, 572

[56] References Cited

U.S. PATENT DOCUMENTS

| | | | |
|---|---|---|---|
| 4,547,898 | 10/1985 | Tsikos | 382/27 |
| 4,641,351 | 2/1987 | Preston Jr. | 382/27 |
| 4,667,295 | 5/1987 | Preston Jr. | 382/27 |
| 4,724,544 | 2/1988 | Matsumoto | 382/27 |

OTHER PUBLICATIONS

IBM Tech. Dis. Bul., vol. 26, No. 12, (May 1984); "2-D Convolution Processor"; pp. 6664-6667.

1985 Conf. Parallel Proc.; IEEE Computer Soc.; "An Architecture for Video Rate Fuzzy Processor"; pp. 576-582.

Information and Control, vol. 5, 1962, pp. 279-323, "Sampling and Reconstruction of Wave-Number-Limited Functions in N-Dimensional Euclidean Spaces", by D. P. Peterson and D. Middleton.

J. Opt. Soc. Am., vol. 69, No. 3, Mar. 1979, pp. 399-406, "Resolution, Signal-to-Noise Ratio, and Measurement Precision", by D. L. Fried.

Proceedings of the IEEE, vol. 67, Jun. 1979, pp. 930-949, "The Processing of Hexagonally Sampled Two-Dimensional Signals", by R. M. Mersereau.

Primary Examiner—Kevin J. Teska
Attorney, Agent, or Firm—William J. Streeter; Wanda K. Denson-Low

[57] ABSTRACT

Am image processing method which is adapted for use in a system having memory for storing in a planar array a plurality of output data samples from a scanning image detector. The invention generates first and second hexagonal sampling patterns within a window on the array. The hexagonal sampling patterns include a first set of data samples with a plurality of peripheral data samples, defining each hexagon, and a data sample at the center of the hexagon. The first and second hexagonal sampling lattices share a common data sample. The generation of the hexagonal sampling patterns is achieved by timing the sampling of the scanning image detectors. A weight is assigned to each data sample within each of the hexagonal sampling lattices and performs a convolution operation on the hexagons to provide a final value for assignment to the common data sample.

6 Claims, 5 Drawing Sheets (a)

(b)

(c)

(d)

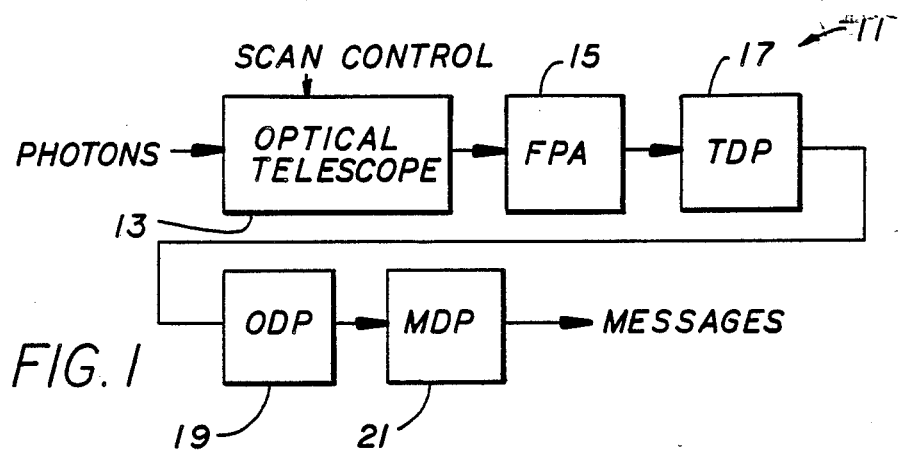
FIG. 1
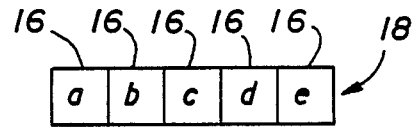
SCANNING RIGHT, EACH ELEMENT IS READ OFF AT AN OFFSET dt
FIG. 2(a)
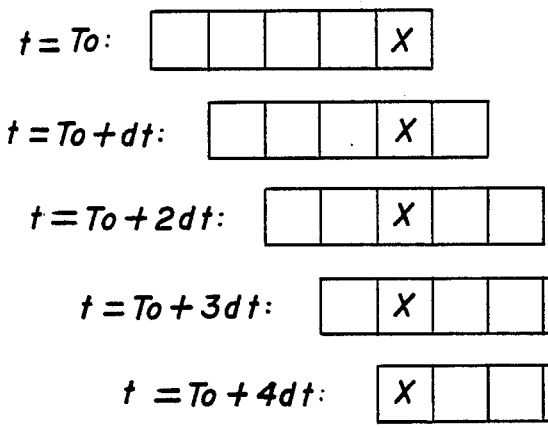
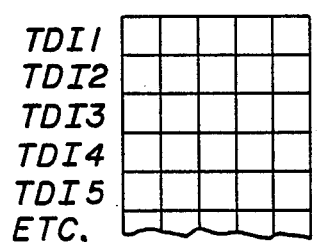
FIG. 2(b)
FIG. 2(c)

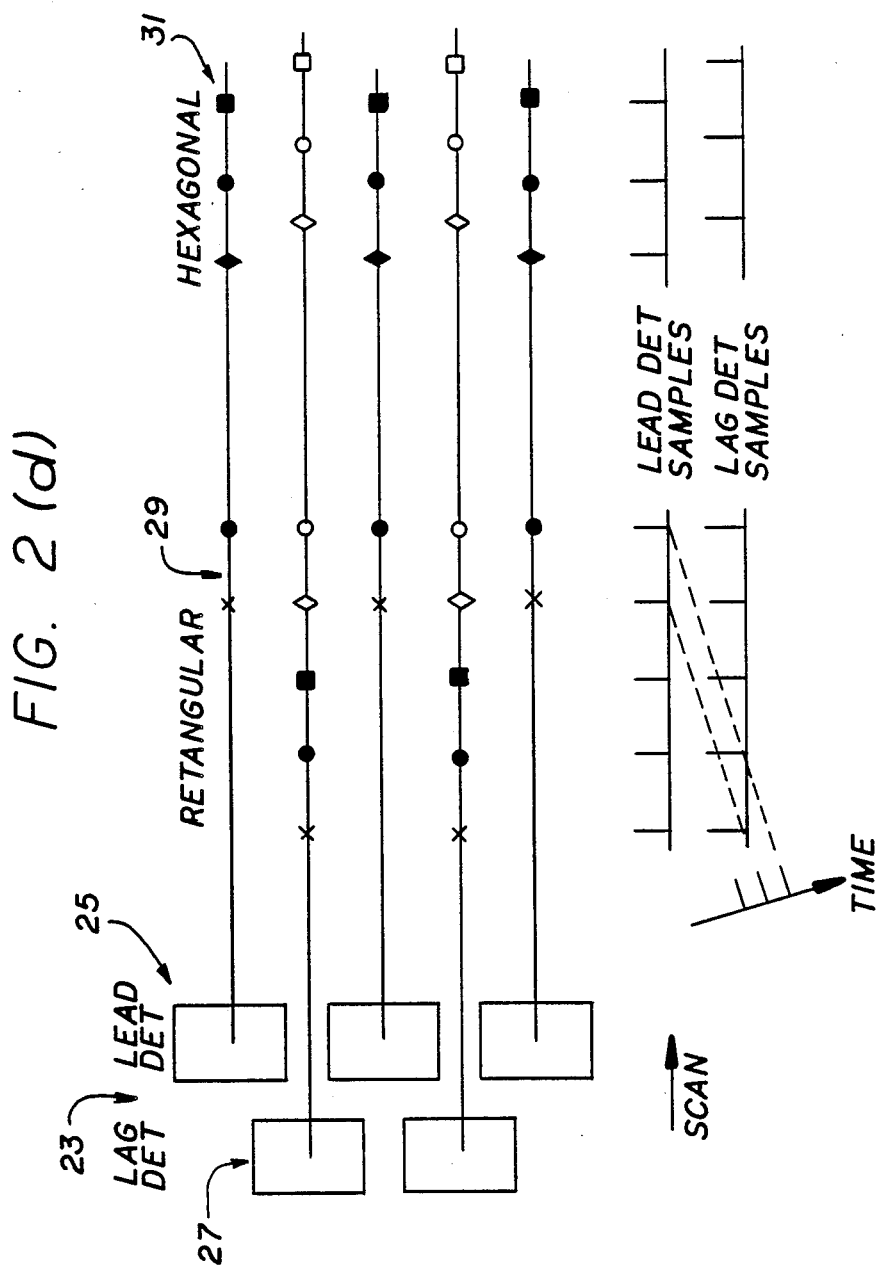

POINT SOURCE — IMAGING OPTICS — FOCAL PLANE — BLUR SPOT — PIXEL

RECTANGULAR PIXELS AND NEAREST NEIGHBORS

HEXAGONAL PIXELS AND NEAREST NEIGHBORS

POINT SOURCE — ASYMMETRIC BLUR SPOT

IN-SCAN / CROSS-SCAN

IN-SCAN / CROSS-SCAN

⊙ = CENTER PIXEL FOR CONVOLUTION

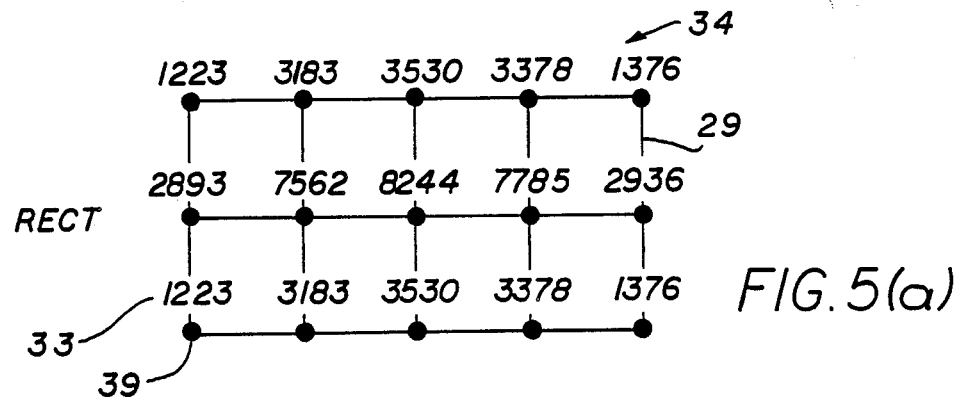
FIG. 5(a)
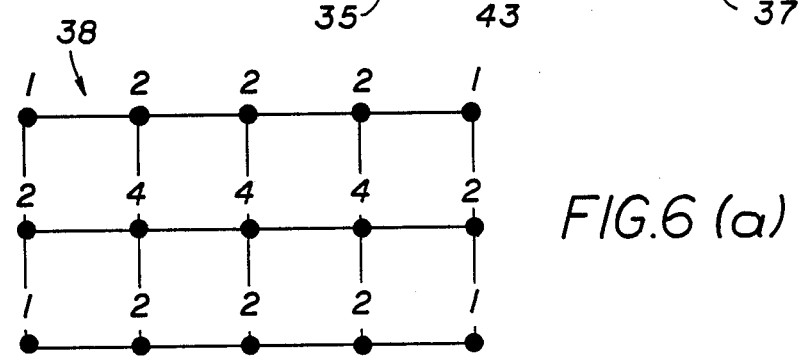
FIG. 5(b)
FIG. 6(a)
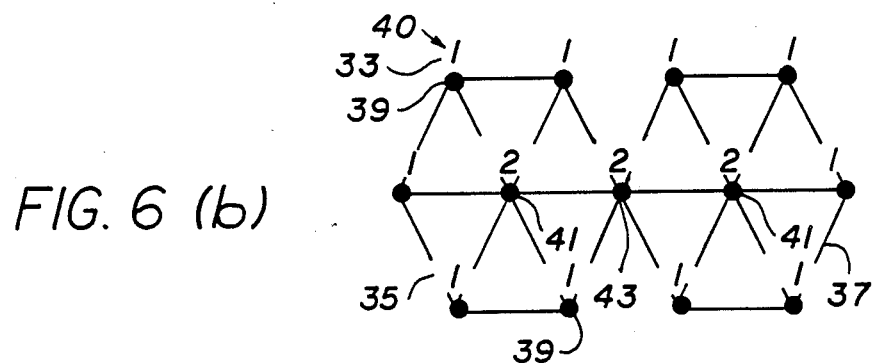
FIG. 6(b)

METHOD AND APPARATUS FOR SAMPLING LATTICE PATTERN GENERATION AND PROCESSING

This invention was made with Government support under contract DASG60-84-C-0068 awarded by the Department of the Army. The Government has certain rights in this invention.

BACKGROUND OF THE INVENTION

1. Field of the Invention

The present invention relates to active as well as passive sensor systems. More specifically, the present invention relates to method and apparatus for processing data provided by such systems.

While the present invention is described herein with reference to an illustrative embodiment for a particular application, the invention is not limited thereto. Those of ordinary skill in the art having access to the teachings provided herein will recognize additional modifications, applications, and embodiments within the scope thereof.

2. Description of the Related Art

Conventional sensing systems typically include semiconductor detection devices which provide hundreds of thousands of individual picture elements or pixels. The collection of pixels may be provided by a two-dimensional focal plane of a staring sensor or by a one-dimensional line of detectors of a scanning sensor.

Each pixel is essentially a signal received by the sensor for a particular point in the filled of view thereof. Conventional processing involves operations on the received signals to improve the quality of a resulting composite image. That is, the signal for each pixel is typically processed to improve the signal-to-noise ratio (SNR) and thereby enhance the quality of the detected image. In many systems, at each point in a scene, signals from neighboring pixels are convolved with a matched filter related to the system defined blur function. This provides a corrected signal value for the point which is used for image enhancement. This filtering process is applied to each point in the scene until the entire scene has been filtered, whereupon, the process is repeated.

Current technology for producing such arrays provides pixel sizes smaller than the typical blur spot created by the imaging optics of the sensor. Accordingly, conventional filtering procedures are time consuming and require substantial processing. Thus, there is a recognized need in the art to improve the processing efficiency of active and passive image processing systems.

One area of potential improvement is in the spatial or pixel sampling lattice. Current systems use a rectangular (or square) lattice. It has been shown that for a circular blur function, a rectangular sampling lattice is less efficient than a hexagonal lattice of pixels or detector elements. For example, Peterson and Middleton show that for signal reconstruction the most efficient lattice, i.e., the lattice with the minimum number of sampling points to achieve an exact reproduction of a circular wave-number-limited function is hexagonal and not rectangular. See "Sampling and Reconstruction of Wave-Number-Limited Functions in N-Dimensional Euclidean Spaces", by D. P. Peterson and D. Middleton, *Information and Control,* vol. 5, 1962, pp. 279–323. See also, "Resolution, Signal-to-Noise Ratio, and Measurement Precision", by D. L. Fried, *J. Opt. Soc. Am.,* vol. 69, No. 3, March 1979, pp. 399–406 and "The Processing of Hexagonally Sampled Two-Dimensional Signals", by R. M. Mersereau, *Proceedings of the IEEE,* vol. 67, June 1979, pp. 930–949.

While these references discuss the theory of hexagonal sampling, there remains a need in the art for a method and apparatus for generating a hexagonal sampling lattice and for using it for active and passive detection with a scanning sensor.

SUMMARY OF THE INVENTION

The need in the art is addressed by the image processing method and system of the present invention. The present invention increases the spatial sampling efficiency of scanning sensor systems which produce a circular or elliptical blur spot on a focal plane array of detectors. The image processing system of the present invention is adapted for use in a system having means for storing in a planar array a plurality of output data samples from a scanning image detector. The system of the invention generates first and second hexagonal sampling patterns within a window on the array. The hexagonal sampling patterns include a first set of data samples with a plurality of peripheral data samples, defining each hexagon, and a data sample at the center of the hexagon. The first and second hexagonal sampling patterns share a common data sample. The generation of the hexagonal sampling patterns is achieved by timing the sampling of the scanning image detectors.

The invention assigns a weight to each data sample within each of the hexagonal sampling patterns and performs a convolution operation on the hexagons to provide a final value for assignment to the common peripheral data sample. The convolution operation is performed by coupling each data sample in each hexagon with an adjacent or partially overlapping data sample in the hexagon. The coupling is effected by adding the products of the weights associated with each data sample and the associated data sample for each coupled pair of data samples to provide first, second, third and fourth lines with first, second, third, and fourth associated line values respectively. Next, each line is coupled with an adjacent line by adding the associated line values to form first and second parallelograms with first and second associated values respectively. The parallelograms are then coupled by adding parallelogram values to provide a third hexagon with an associated value. Finally, the first and second hexagons are coupled by adding the associated hexagon values to provide the final value for the common data sample.

In a specific embodiment, a particularly unique and efficient operation is afforded in that the invention stores the line, parallelogram and hexagon values for selective recall and use during a convolution operation with respect to a subsequent data sample. In a more specific embodiment, a further improvement in efficiency is afforded by the assignment of tap weights to the data samples which are integer powers of two.

BRIEF DESCRIPTION OF THE DRAWINGS

FIG. 1 shows a block diagram of a typical space based electro-optical scanning sensor system.

FIG. 2(*a*) shows a scanning focal plane array configured as a rectangular array of individual Time Delay and Integration (TDI) sets comprising five detector elements.

FIG. 2(*b*) illustrates the delay and combination of the TDI sets of FIG. 2(*a*).

FIG. 2(c) shows a two-dimensional array of pixels resulting from the delay and combination of TDI sets in the cross-scan direction.

FIG. 2(d) shows a typical focal plane layout of detectors for a scanning sensor which provides an interlaced scan.

FIG. 5(a) shows the structure of a typical matched filter for a nonsymmetrical blur spot based on a rectangular lattice.

FIG. 5(b) shows the structure of a typical matched filter for the nonsymmetrical blur spot based on a hexagonal lattice.

FIG. 6(a) shows an approximate rectangular lattice filter implemented with filter weights which are integer powers of two.

FIG. 6(b) shows an approximate hexagonal lattice filter implemented with filter weights which are integer powers of two.

DESCRIPTION OF THE INVENTION

Figure 3A:
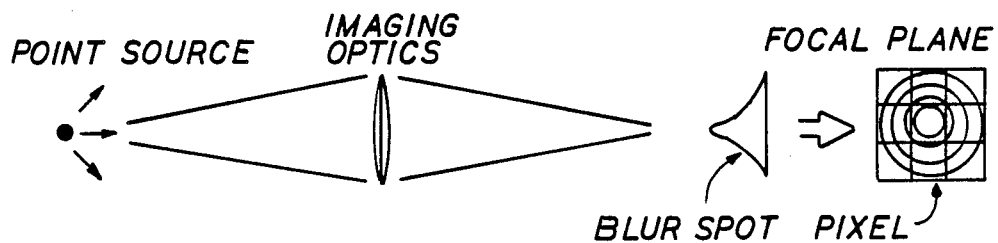
FIG. 3(a) illustrates the spreading of the intensity distribution of a point source introduced by a typical optical imaging system.

A block diagram of a typical space based electrooptical scanning sensor system 11 is shown in FIG. 1. Input signals, including target and background clutter, are collected by a conventional optical telescope 13 and imaged onto a focal plane with an array of sensors 15. The sensor array 15 contains columns of detectors which convert the input energy to electrical voltage signals. As is well known in the art, focal plane arrays may be implemented by an array of staring sensors or by a typically smaller array of scanning sensor. Scanning focal plane arrays can be configured as rectangular arrays of individual Time Delay and Integration (TDI) sets, which, in the example of FIG. 2(a), comprise five detector elements 16. The TDI set 18 provides one pixel of input video. As the line of TDI's scan across the sensor's field of view, two processes occur. First, in each TDI set, each of the five detector elements receive light from the same point in space. These individual signals must be slightly delayed to align with each other in time to allow for subsequent integration to yield a final signal sample for the pixel element. For example, at $t = T_0$, where $T_0$ is an initial instant in time, a object, shown at "X" is first detected by the rightmost detector labeled 'e'. When the detectors 16 are sampled at time $t = T_0 + dt$, where d is the time between samples, the TDI set 18 has scanned right by one element so the target X is detected by the next element 16 labeled 'd' and so on. Thus, scanning right and assuming one sample per dwell, each element is read off at an offset dt so that each point in space is ultimately detected five times and combined. Second, each TDI set of signals is sampled at a set second time delay D, between pixels, which is longer than the first TDI delay d within the TDI sets (where $d = D$ for one sample per dwell). The TDI sets are combined as shown in FIG. 2(b). Ultimately, by scanning the one dimensional detector array and combining the TDI sets in the cross-scan direction, a two dimensional rectangular array of pixels 29 is created on each complete scanning cycle which provides a map of the entire field-of-view (See FIG. 2(c)).

FIG. 2d shows a typical focal plane layout of detectors 23 for a scanning sensor which provides an interlaced scan. For simplicity, only two columns of detectors 25 and 27 are shown. The two columns of detectors 23 are designed with offset row centers. The columns are separated by S radians. If the scan rate is R radians per second, the time delay d between the two detector columns, viewed as a fixed line in space parallel to a detector column, is equal to S/R seconds.

To create the rectangular lattice of detector samples 29, all detectors 23 are sampled simultaneously at an integer fraction of the delay time d, i.e., $t = d/n$ where t is the sampling interval and n, an integer constant, is the number of samples in a dwell (the time a target is in a single detector). Again the rectangular lattice 29 is achieved by delaying the sample values from the leading detector column until they align with the trailing column i.e. by n sample times. Since both columns of detectors have offset row centers, the aligned columns contain interlaced sample centers. This has the effect of doubling the spatial sample density in the cross-scan direction.

Returning briefly to FIG. 1, the detector output signals are processed by a set of filters (not shown) in a time dependent processor (TDP) 17. As discussed more fully below, the filters are typically 2-dimensional finite impulse response filters which are matched approximately to the expected form of the target signal. As part of the convolution operation performed by the time dependent processor, the filters integrate the input signal so that the output signal from the filter is large when a target is present in the field-of-view and small otherwise. Target detection is accomplished by flagging those output signals which exceed a detection threshold. The filtering operation is repeated continuously over the entire field of view.

When a target is detected, it and the sub-image surrounding it are transmitted to an object dependent processor (ODP) 19. The ODP may be implemented with a microprocessor as is known in the art. The ODP estimates the various parameters associated with target detection, e.g. the number of targets present, the intensity and position of the targets in the focal plane, the quality of the targets, and etc. These estimates are transmitted to a mission dependent processor (MDP) 21. The MDP 21 combines multiple frames (snapshots) of target data into tracks which contain a time history of the path of a target. Messages, appropriate for a given mission, are created as a function of the detected target tracks add transmitted as required.

Figure 3B:
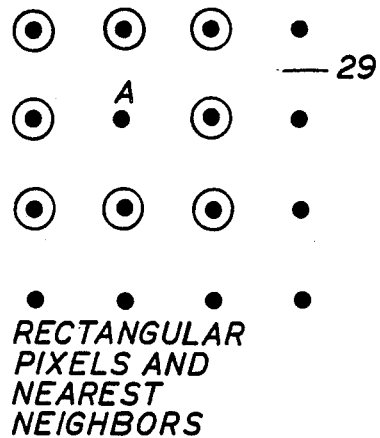
FIG. 3(b) is representative of the output of the focal plane array for the intensity distribution of FIG. 3(a) in a rectangular pixel array.
Figure 3C:
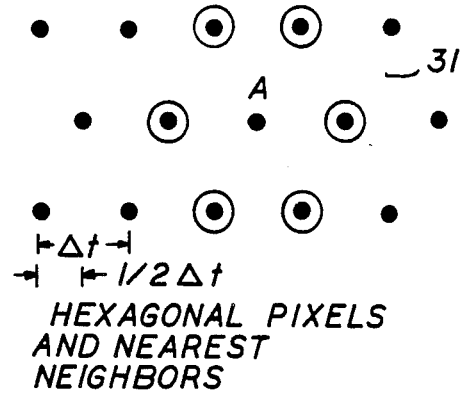
FIG. 3(c) is representative of the output of the focal plane array for the intensity distribution of FIG. 3(a) in a hexagonal pixel array.

A typical optical imaging system introduces some spreading of a point source in space. See FIG. 3(a). Energy from a point source is provided by imaging optics to a focal plane where it appears as a blur spot having the intensity distribution of the side and front views shown. This illustrates how some of the energy from the point source may overflow a central pixel and illuminate some of its nearest neighbors. FIG. 3(b) is representative of the output of the focal plane array for the intensity distribution shown. In the simplest case, the scanning sensor produces a series of pixels in which the relative length of the pixel is the same in both the in-scan and the ross-scan directions. In this case, the blur spot would be circularly symmetric within the array. If the pixels are of the conventional rectangular configuration, a pixel would have 8 nearest neighbors. The above mentioned convolution process would, in the simplest form, involve the multiplication of all nine pixels by weighting factors, called tap weights. The product of the samples and the tap weights would be added together to provide a final value for the central pixel. This process continue across the entire pixel matrix and on the next cycle, when the array is renewed, the process starts again.

The amount of processing required by the TDP 17 for a system of this type is a function of the number of detectors in the sensor and the rate at which they are sampled. As discussed more fully below, one aspect of the present invention is the provision of an improvement by which these processing requirements are significantly reduced. The improvement is provided, in part, by an advantageous hexagonal array of signal or data samples. Yet, a key aspect of the present invention resides in the recognition that a hexagonal sampling lattice may be generated by timing the sampling of the detectors. That is, by shifting the relative clock sample times the effective spatial sample position may be made to shift. With the proper relative sample times between the too clocks, the hexagonal sampling structure may be achieved. With this recognition, the necessary timing will be readily recognized by one of ordinary skill in the art. That is, the hexagonal sampling lattice 31 is generated by sampling the two detector columns with two clocks 180 degrees out of phase in the in-scan direction. The timing of the two clocks is so controlled by the focal plane array 15.

The resulting staggering of pixels across the focal plane provides a hexagonal packing of pixels on the scanning plane and results in a more efficient sampling and processing algorithm. With the hexagonal sampling lattice 31, the central pixel for the same area now has only six nearest neighbors instead of eight. Now, in the simple case, the convolution algorithm will have only 7 multiplies and adds instead of nine as for the rectangular case.

Figure 4A:
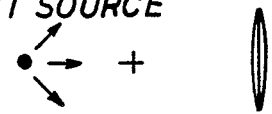
FIG. 4(a) shows the generation of an asymmetric blur spot, as from an off-axis sensor or a large number of samples per dwell.
Figure 4B:
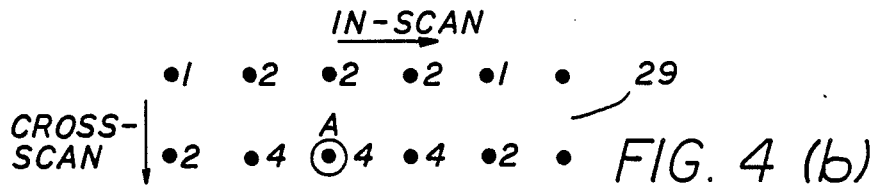
FIG. 4(b) shows a rectangular sampling lattice.
Figure 4C:
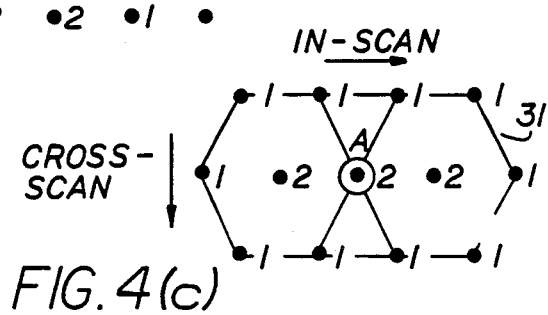
FIG. 4(c) shows a hexagonal sampling lattice.
Figure 7:
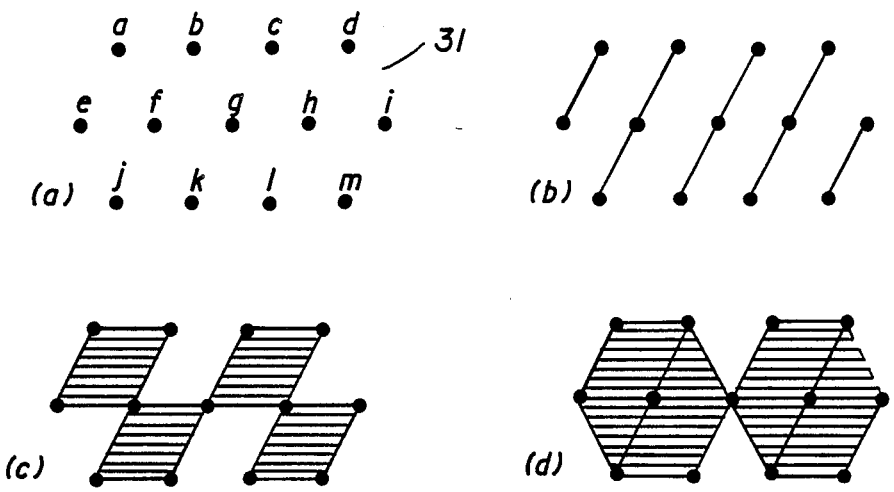
FIGS. 7(a) through 7(d) illustrate the method of the present invention.

FIGS. 4(a), (b) and (c) show the generation of an asymmetric blur spot, as from an off-axis sensor or a large number of samples per dwell, a rectangular sampling lattice 29 and a hexagonal sampling lattice 31, respectively. Both lattices 29 and 31 are designed for asymmetric blur spots.

When complemented with tap weights 33, the sampling lattices 29 and 31 provide filters 34 and 36 or 38 and 40 respectively for the time dependent processor 17. See FIG. 5. The TDP 17 utilizes the filters to convolve the data samples from the focal plane array 15 to provide the TDP output signal. Each filter operates within a window (not shown) which is sequentially moved over the array of data samples provided by the focal plane array 15. The structure of a typical matched filter 34, for a nonsymmetrical blur spot, based on a rectangular lattice 29, is shown in FIG. (a). The structure of a typical matched filter 36, for the nonsymmetrical blur spot, based on a hexagonal lattice 31, is shown in FIG. 5(b)

The hexagonal lattice 31 is composed of two hexagons 35 and 37 each defined by six peripheral data samples 39 and a center data sample 41. The two hexagons 35 and 37 share a common peripheral data sample 41. The filters in FIGS. 3(a) and 3(b) are matched in that the filter weights 33 are chosen for optimum filter efficiency. Those skilled in the art will recognize that a feature of the present invention s the realization of the filters 29 and 31 with filter weights 33 at the data samples 39 which are multiples of powers of two. Thus FIGS. 6(a) and 6(b) show approximate rectangular and hexagonal lattice filters 29 and 31 implemented with filter weights which are integer powers of two. These weights permit efficient though less than optimal performance of the filters requiring only shifts and adds instead of the shifts, adds and multiplies required by ideal matched filters.

Because the approximate filters are mismatched with respect to the signal amplitude, the output signal-to-noise (SNR) of the approximate filter is lower than that of the ideal matched filter. However, the output SNR has been found to be only slightly degraded because the matched filters are quite tolerant of amplitude mismatches. Thus, satisfactory performance may be realized in the approximate electro-optical point source filters at significantly reduced implementation cost. The approximate hexagonal filter 31 of FIG. 6(b) consists of 13 tap weights. The three center data samples have a weight of 2 while the surrounding ten have weights of 1. These weights are assigned by techniques known in the art and are chosen with reference to the characteristics of the sensor. As such, the integer weights are application dependent.

Another aspect of the present invention is the provision of an improvement in the method used to process these signals which offers substantial reductions in the size, weight and power of the processing equipment required for many applications. The advantageous method of the present invention will now be described with reference to the asymmetric sampling lattice although those skilled in the art will recognize that the teaching provided hereby will be applicable to the more simple case of the perfectly symmetric hexagon.

In accordance with the advantageous method of the present invention, the time dependent processor 17 convolves the first and second hexagons 35 and 37 together to provide a final value for assignment to the data sample at the common peripheral tap. The method of the present invention is illustrated in FIGS. 7(a) through 7(d) and includes the steps of:
  (i) coupling adjacent points by adding the product of each tap weight and associated data sample with the product of an adjacent tap weight and data sample to provide eight line values corresponding to the eight 60 degree line segments shown, see FIG. 7(b);
  (ii) coupling adjacent lines by adding the corresponding values to provide four parallelogram values corresponding to the four parallelograms shown shaded, see FIG. 7(c);
  (iii) coupling he four parallelograms, by adding the corresponding parallelogram values, to provide two hexagon values corresponding to the hexagons shown shaded, see FIG. 7(d); and
  (iv) coupling the two hexagons (see FIG. 7(d)) by adding the corresponding hexagon values to provide a final value for the central pixel 'g'. This final value represents the signal output.

Figure 8:
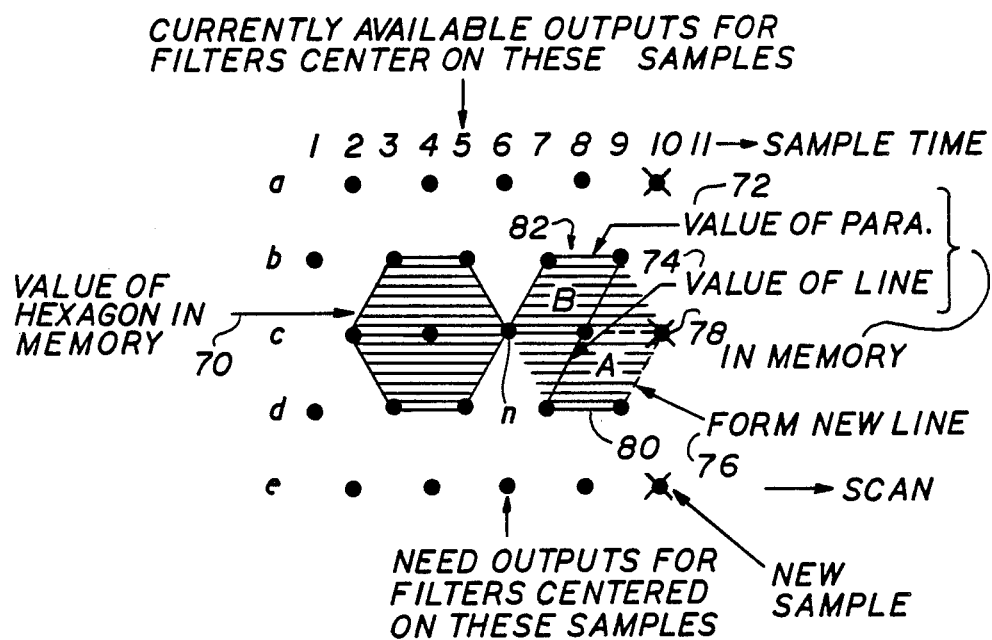
FIG. 8 illustrates the recall and reuse of stored intermediate additions in subsequent calculations in accordance with the teachings of the present invention.

The present invention minimizes time-consuming multiplications and allows various intermediate additions to be reused. Thus, the present invention increases the spatial sampling efficiency of scanning sensor systems which produce a circular or elliptical blur spot on a focal plane array of detectors. (Spatial sampling efficiency is a measure of the number of samples of detector outputs which are employed to produce a specified optical sensitivity for an object within the detectors field of view.) As illustrated in FIG. 8, by storing the intermediate additions, viz., the intermediate line, parallelogram, and hexagon values, they can be recalled and reused in subsequent calculations. That is, to generate an output for a new point 'n', the value of the previously calculated hexagon 70 is recalled from memory along with the value for the parallelogram 72, and the line 74. The line 74 is combine with the new line 76 formed with the new sample 78 to form a new parallelogram 80. The value of the new parallelogram 80 is combined with the stored value for the parallelogram 72 to generate a new hexagon value 82. The value for the new hexagon 82 is added to the stored value for the hexagon 70 to provide the final value for the point 'n'.

Thus, the present invention has been described herein with reference to an illustrative embodiment for a particular application. Those skilled in the art having access to the teachings provided herein will recognize additional modifications, applications and embodiments within the scope thereof.

It is intended by the appended claims to cover such applications, modifications and embodiments within the scope of the invention.

Accordingly,

What is claimed is:

1. A method for processing image data for use with means for storing in a planar array a plurality of output data samples from a scanning image detector, said method including the steps of:
   (a) sampling said scanning image sensor during predetermined time intervals to generate first and second hexagonal sampling patterns within a window on said array, said hexagonal sampling patterns including a first set of data samples including a plurality of peripheral data samples defining each hexagonal sampling pattern and a data sample at the center of each hexagon in each pattern, said first and second hexagonal sampling patterns sharing a common data sample;
   (b) assigning a weight to each data sample within each of said first and second hexagonal sampling patterns; and
   (c) convolving said first and second hexagonal sampling patterns together to provide a final value for assignment to said common data sample, including the steps of:
      (c1) coupling each data sample in each hexagon with an adjacent data sample in the hexagon by adding products of the weights associated with each data sample and associated data sample for each coupled pair of data samples to provide first, second, third and fourth lines with first, second, third, and fourth associated line values respectively;
      (c2) coupling each line with an adjacent line by adding the line values associated therewith to form first and second parallelograms with first and second associated values respectively;
      (c3) coupling the parallelograms by adding parallelogram values to provide a hexagon with an associated value; and
      (c4) coupling said first and second hexagons by adding said associated hexagon values to provide said final value for said common data sample.

2. The image processing method of claim 1 further including the step of storing said line values, said parallelogram values, and said hexagon values.

3. The image processing method of claim 2 including the steps of:
   (d) timing the sampling of said scanning image detectors to provide a second set of data samples for combination with at least some of said first data samples to provide a third hexagonal sampling pattern adjacent to said second hexagonal sampling pattern, both patterns being within a second window on said array, said hexagonal sampling patterns including a plurality of peripheral data samples, defining each hexagon, and a data sample at the center of the hexagon, said second and third hexagonal sampling patterns sharing a second common data sample within said widow;
   (e) assigning a weight to each data sample within said third set of samples; and
   (f) convolving said hexagonal sampling patterns together to provide a final value for assignment to said second common data sample, including the steps of:
      (f1) coupling a data sample from said second set of data samples with a data sample from said first set of data samples by adding the weights associated therewith to provide a fifth line with an associated line value;
      (f2) recalling a stored line value and adding it to said fifth line value to provide a third parallelogram with an associated parallelogram value;
      (f3) recalling a stored parallelogram value and adding it to said third parallelogram value to provide a second hexagon value; and
      (f4) recalling a stored hexagon value and adding it to said second hexagon value to provide a final value for said second common peripheral point.

4. The image processing method of claim 2 including the step of selectively recalling said values.

5. The image processing method of claim 4 including the step of providing weights which are integer powers of two.

6. A method for generating a hexagonal sampling lattice with a scanning sensor including the steps of:
   (a) providing a first set of sensors for scanning in a predetermined direction;
   (b) providing a second set of sensors, interlaced relative to said first set of scanning sensors, for scanning in said predetermined direction;
   (c) sampling said first set of scanning sensors to provide a first set of data samples; and
   (d) timing the sampling of said second set of scanning sensors to provide a second set of data samples which when combined with said first set of data samples provides said hexagonal sampling lattice.

* * * * *